(12) United States Patent
Nakayama

(10) Patent No.: US 7,864,438 B2
(45) Date of Patent: Jan. 4, 2011

(54) IMAGE FORMING LENS AND MICROSCOPE APPARATUS USING THE SAME

(75) Inventor: Hiroaki Nakayama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/729,858

(22) Filed: Mar. 23, 2010

(65) Prior Publication Data

US 2010/0172029 A1 Jul. 8, 2010

Related U.S. Application Data

(63) Continuation of application No. PCT/JP2008/069075, filed on Oct. 15, 2008.

(30) Foreign Application Priority Data

Oct. 22, 2007 (JP) .............................. 2007-273276

(51) Int. Cl.
G02B 21/02 (2006.01)

(52) U.S. Cl. ...................................... 359/661

(58) Field of Classification Search .......... 359/656–661
See application file for complete search history.

(56) References Cited

U.S. PATENT DOCUMENTS 5,394,271 A * 2/1995 Tanaka et al. ................ 359/656

FOREIGN PATENT DOCUMENTS

| JP | 05-113540 A | 5/1993 |
|---|---|---|
| JP | 2521959 B2 | 5/1996 |
| JP | 9-243924 A | 9/1997 |
| JP | 10-221597 A | 8/1998 |
| JP | 11-160624 A | 6/1999 |
| JP | 11-316337 A | 11/1999 |
| JP | 2000-105340 A | 4/2000 |
| JP | 2002-169098 A | 6/2002 |
| JP | 2002-341249 A | 11/2002 |
| JP | 2003-195175 A | 7/2003 |
| JP | 2004-62118 A | 2/2004 |
| JP | 2004-212920 A | 7/2004 |
| JP | 2006-133248 A | 5/2006 |

* cited by examiner

*Primary Examiner*—Joseph Martinez
(74) *Attorney, Agent, or Firm*—Miles & Stockbridge P.C.

(57) ABSTRACT

An image forming lens has a configuration that an image forming lens IL for receiving parallel beams of light emitted from an observation target object and emerging from an infinity-designed objective lens of a microscope and forming an image of the observation target object in a predetermined position, is constructed of, in order from an object side, a first lens group G1 having positive refractive power and a second lens group G2 having negative refractive power, and the first lens group is constructed of a positive lens (e.g., a biconvex lens L1) and a negative lens (e.g., a negative meniscus lens L2). Glass materials of the positive lens and the negative lens configuring the first lens group G1 satisfy conditions of predetermined vdht and partial dispersion ratio Pht, then a transmittance, with respect to the light having a wavelength of 340 nm, of each of the glass materials of all the lenses is equal to or larger than 50% per glass thickness of 10 mm, and the transmittance with respect to the light having the wavelength of 360 nm is equal to or larger than 80% per glass thickness of 10 mm.

11 Claims, 20 Drawing Sheets

IMAGE FORMING LENS AND MICROSCOPE APPARATUS USING THE SAME

CROSS-REFERENCE TO RELATED APPLICATION

This application is a continuation of International Application No. PCT/JP2008/069075 filed Oct. 15, 2008.

TECHNICAL FIELD

The present invention relates to an image forming lens for forming an image through an infinity-designed objective lens and to a microscope apparatus using the same lens.

BACKGROUND ART

An image forming lens for forming an image from an infinity-designed objective lens is developed as an image forming lens of which various aberrations are corrected (refer to, e.g., Japanese Patent Publication No. 2521959 or Japanese Patent Laid-Open Publication No. 05-113540). Over the recent years, a fluorescent observation has been actively utilized for a biological research. Especially, an actively used technique is a technique of observing simultaneously behaviors of a plurality of proteins by using fluorescent makers having a plurality of different fluorescent wavelengths. On this occasion, if the fluorescent wavelengths of the fluorescent makers are close to each other, wavelength ranges thereof are overlapped with each other, and it can not be determined from which fluorescent marker the fluorescence is emitted. It is therefore desirable that the fluorescent wavelengths of the individual fluorescent markers are distanced to some extent. As a result, the fluorescent makers having a variety of fluorescent wavelengths ranging from the near infrared to the near ultraviolet are employed, and an optical system of a microscope for observing the fluorescent markers is requested to have flexibility to a wide wavelength range. Moreover, a two-photon-excited luminescence observation contrived to reduce a damage to a cell by using infrared-rays and a luminescence observation using near ultraviolet rays for improving a resolution come to be carried out, and the microscope is requested to have an optical system which corrects aberrations in wave ranges hereof and exhibits a high transmittance, and this request is given to an image forming lens as well as to the objective lens.

The hitherto-used image forming lens has, however, a problem that a chromatic aberration is not sufficiently corrected, and further transmittance is not taken into consideration.

DISCLOSURE OF THE INVENTION

It is an object of the present invention, which was devised in view of these problems, to provide an image forming lens which corrects a chromatic aberration in a wide wavelength range and exhibits a high transmittance and a microscope apparatus using this image forming lens.

To accomplish the object, according to the present invention, an image forming lens for receiving parallel beams of light emitted from an observation target object and emerging from an infinity-designed objective lens of a microscope and for forming an image of the observation target object in a predetermined position, comprises in order from an object side: a first lens group having positive refractive power; and a second lens group having negative refractive power, and the first lens group comprises a positive lens (e.g., a biconvex lens L1 in the embodiment) and a negative lens (e.g., a negative meniscus lens L2 in the embodiment). Herein, when nd denotes a refractive index of glass materials of the lenses which constitute the first lens group and the second lens group with respect to d-line, nh denotes the refractive index of the glass materials with respect to h-line and nt denotes the refractive index of the glass materials with respect to t-line, and νdht and a partial dispersion ratio Pht are defined by the following conditional expressions:

$$\nu dht=(nd-1)/(nh-nt)$$

$$Pht=(nh-nd)/(nd-nt),$$

the following conditional exrepssion are satisfied:

$$\nu dht1 > 24$$

$$\nu dht1 - \nu dht2 > 5$$

$$|(Pht1 - Pht2)/(\nu dht1 - \nu dht2)| < 0.015$$

where νdht1 and Pht1 respectively denote νdht and the partial dispersion ratio Pht of a glass material of the positive lens configuring the first lens group, and νdht2 and Pht2 respectively denote νdht and the partial dispersion ratio Pht of a glass material of the negative lens configuring the first lens group, the following conditional expression is satisfied:

$$0.7 < f1/fT < 0.9$$

where fT denotes a focal length of the image forming lens and f1 denotes a focal length of the first lens group, a transmittance of each of the glass materials of all the lenses configuring the first lens group and the second lens group with respect to the light having a wavelength of 340 nm is equal to or larger than 50% per glass thickness of 10 mm, and the transmittance of each of the glass materials of all the lenses configuring the first lens group and the second lens group with respect to the light having the wavelength of 360 nm is equal to or larger than 80% per glass thickness of 10 mm.

Further, in the image forming lens according to the present invention, it is preferable that the second lens group includes a positive lens (e.g., a positive meniscus lens L4 in the embodiment) and a negative lens (e.g., a negative meniscus lens L3 in the embodiment), and the following conditional expressions are satisfied:

$$\nu dht3 > 20$$

$$\nu dht3 - \nu dht4 > 2$$

$$|(Pht3 - Pht4)/(\nu dht3 - \nu dht4)| < 0.045$$

where νdht3 and Pht3 respectively denote νdht and the partial dispersion ratio Pht of the glass material of the positive lens configuring the second lens group, and νdht4 and Pht4 respectively denote νdht and the partial dispersion ratio Pht of the glass material of the negative lens configuring the second lens group.

Still further, in the image forming lens according to the present invention, it is preferable that a condition of the following conditional expression is satisfied:

$$-3 < f1n/f1 < -0.5$$

where f1n denotes a focal length of the positive lens configuring the first lens group and f1 denotes a focal length of the first lens group.

Yet further, in the image forming lens according to the present invention, it is preferable that the first lens group comprises a cemented lens formed by a biconvex lens cemented with a negative meniscus lens and a cemented surface of the cemented lens has a concave surface facing the object side, and the following conditional expression is satisfied:

$$0.0010 < \Phi < 0.0030$$

where $\Phi$ denotes refractive power of the cemented surface.

Furthermore, in the image forming lens according to the present invention, it is preferable that a most object side surface of the second lens group is convex on the object side.

Moreover, a microscope apparatus according to the present invention comprises any of the above-described image forming lenses as a second objective lens.

When the image forming lens according to the present invention is configured as described above, the chromatic aberration can be well corrected in the wide wavelength range, and the high transmittance can be realized. Then, when the image forming lens is applied as a second objective lens to the microscope apparatus, it is feasible to actualize the microscope apparatus capable of observing the observation target object with a high resolution and a high contrast in the wide wavelength range.

EMBODIMENT FOR CARRYING OUT THE INVENTION

Figure 1:
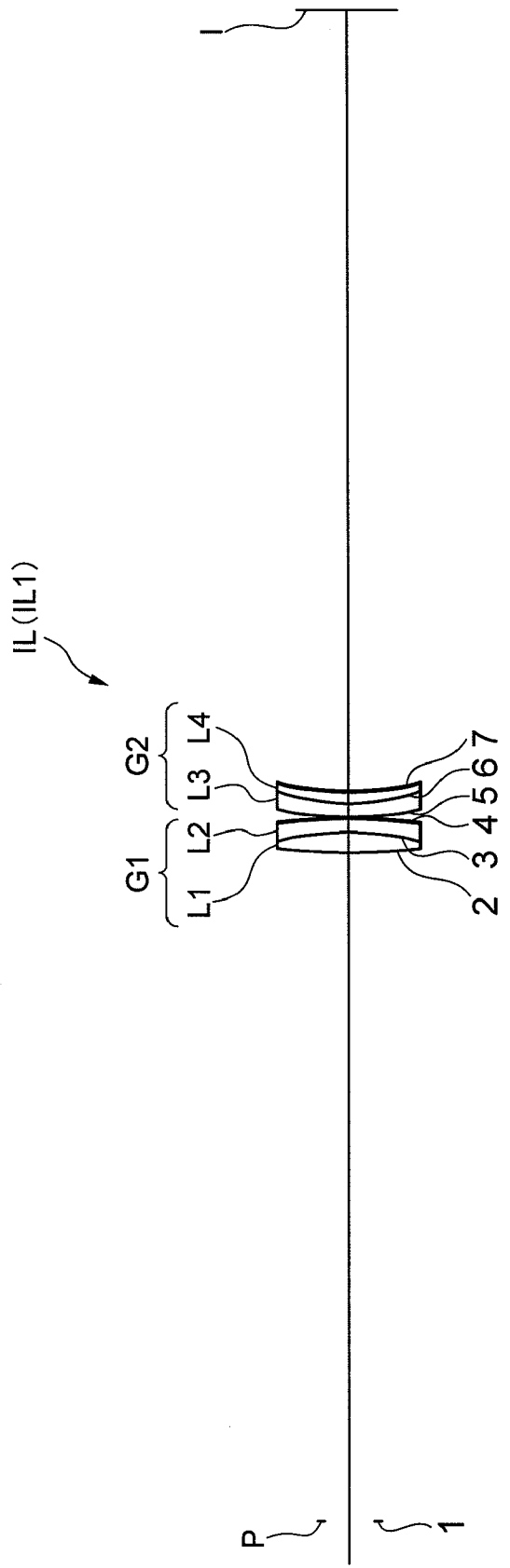
FIG. 1 is a lens configuration diagram illustrating a configuration of an image forming lens according to Example 1 of the present invention.

A preferred embodiment of the present invention will hereinafter be described with reference to the drawings. An image forming lens according to the present invention receives, in a microscope etc, parallel beams of light emitted from an observation target object and emerging from an infinity-designed objective lens, and forms an image of the observation target object in a predetermined position. As illustrated in FIG. 1, an image forming lens IL is constructed of, in order from an object side, a first lens group G1 having positive refractive power and a second lens group G2 having negative refractive power, and is also configured to form the image of the beams of light incident from an unillustrated objective lens on an image surface I. Herein, the first lens group G1 is constructed of a positive lens (which is a biconvex lens L1 in FIG. 1) and a negative lens (which is a negative meniscus lens L2 in FIG. 1). It should be noted that in this image forming lens IL, the first lens group G1 may also be, as will be depicted in following Examples, constructed as a cemented lens formed by the positive lens cemented with the negative lens, and may also be disposed in the way of having a predetermined air gap therebetween.

Further, the second lens group G2 may be, as will be depicted in following Examples, constructed of a positive lens (which is a positive meniscus lens L4 in FIG. 1) and a negative lens (which is a negative meniscus lens L3 in FIG. 1) and may also be constructed of a negative single lens (which is a negative meniscus lens L3 in FIG. 17) and may further be constructed as a cemented lens in the case of its being constructed of the positive lens and the negative lens, and may also be disposed in a way that has the predetermined air gap therebetween. Herein, if the most object side surface of the second lens group G2 is formed with a concave surface facing the object side, an angle of incidence of an upper coma of off-axis beams increases, resulting in occurrence of a comatic aberration. Accordingly, it is desirable that the most object side surface of the second lens group G2 is convex.

Such being the case, conditions for configuring the image forming lens IL according to the present invention will hereinafter be described. To start with, when nd denotes a refractive index of glass materials of the lenses which constitute the image forming lens IL with respect to d-line, nh denotes the refractive index of the glass materials with respect to h-line and nt denotes the refractive index of the glass materials with respect to t-line, and vdht is defined by the following conditional expression (a) and a partial dispersion ratio Pht is defined by the following conditional expression (b), the image forming lens IL according to the working example is configured to satisfy the following conditional expressions (1)-(3):

$$vdht > 24 \tag{1}$$

$$vdht1 - vdht2 > 5 \tag{2}$$

$$|(Pht1-Pht2)/(vdht1-vdht2)| < 0.015 \tag{3}$$

where $$vdht = (nd-1)/(nh-nt) \tag{a}$$

$$Pht = (nh-nd)/(nd-nt) \tag{b, and}$$

where vdht1 and Pht1 respectively denote vdht and the partial dispersion ratio Pht of the glass material of the positive lens (e.g., the biconvex lens L1) configuring the first lens group G1 in the image forming lens IL and vdht2 and Pht2 respectively denote vdht and the partial dispersion ratio Pht of the glass material of the negative lens (e.g., the negative meniscus lens L2) configuring the first lens group G1.

The conditional expression (1) represents a condition for reducing the chromatic aberration which occurs in the first lens group G1. It is desirable that restraint of the chromatic aberration in the first lens group G1 involves using a low dispersion glass for the positive lens. If under a lower limit value of the conditional expression (1), the chromatic aberration increases, which is an undesirable aspect.

The conditional expression (2) also represents the condition for reducing the chromatic aberration which occurs in the first lens group G1. It is desirable that correction of the chromatic aberration caused in the positive lens by use of the negative lens in the first lens group G1 involves employment of the glass having a larger dispersion than the positive lens to the negative lens. If under the lower limit value of the conditional expression (2), the chromatic aberration increases, which is the undesirable aspect.

The conditional expression (3) represents a condition for reducing secondary spectrum of the chromatic aberration which occurs in the first lens group G1. If over an upper limit value of the conditional expression (3), the secondary spectrum caused in the first lens group G1 augments, and it is difficult to restrain the chromatic aberration within a focal depth in the wide wavelength range, which is an undesirable aspect.

Note that the glass materials of all the lenses configuring the image forming lens IL are constructed so that the transmittance with respect to the light that is 340 nm in wavelength is equal to or larger than 50% per glass thickness of 10 mm and that the transmittance with respect to the light that is 360 nm in wavelength is equal to or larger than 80% per glass thickness of 10 mm.

Thus, all the lenses involve use of the glasses exhibiting the high transmittance in the near ultraviolet region where the transmittance becomes low, whereby the image forming lens IL having the high transmittance in the wide wavelength range can be realized.

Further, the second lens group G2 of the image forming lens IL is constructed of the positive lens (the biconvex lens L3 in FIG. 5) and the negative lens (a biconcave lens L4 in FIG. 5), in which the image forming lens IL according to the present embodiment is configured to satisfy the following conditional expressions (4)-(6):

$$vdht3 > 20 \tag{4}$$

$$vdht3 - vdht4 > 2 \tag{5}$$

$$|(Pht3-Pht4)/(vdht3-vdht4)| < 0.045 \tag{6}$$

where vdht3 and Pht3 respectively denote vdht and the partial dispersion ratio Pht of the glass material of the positive lens (e.g., the biconvex lens L3) defined by the above conditional expressions (a) and (b), and vdht4 and Pht4 respectively denote vdht and the partial dispersion ratio Pht of the glass material of the negative lens (e.g., the biconcave lens L4).

The conditional expression (4) represents a condition for reducing the chromatic aberration which occurs in the second lens group G2. It is desirable that the restraint of the chromatic aberration in the second lens group G2 involves using the low dispersion glass for the positive lens. If under the lower limit value of the conditional formula (4), the chromatic aberration increases, which is an undesirable aspect.

The conditional expression (5) also represents a condition for reducing the chromatic aberration which occurs in the second lens group G2. It is desirable that the correction of the chromatic aberration caused in the positive lens by use of the negative lens in the second lens group G2 involves employment of the glass having the larger dispersion than the positive lens to the negative lens. If under the lower limit value of the conditional expression (5), the chromatic aberration increases, which is the undesirable aspect.

The conditional expression (6) represents a condition for reducing secondary spectrum of the chromatic aberration which occurs in the second lens group G2. If over the upper limit value of the conditional expression (6), the secondary spectrum caused in the second lens group G2 augments, and it is difficult to restrain the chromatic aberration within the focal depth in the wide wavelength range, which is an undesirable aspect.

Further, it is desirable that the image forming lens IL satisfies the following conditional expression (7):

$$0.7 < f1/fT < 0.9 \tag{7}$$

where fT denotes a focal length of the image forming lens, and f1 denotes a focal length of the first lens group G1.

The conditional expression (7) represents a condition for restraining a fluctuation in aberration caused when a position of an entrance pupil of the image forming lens IL varies. A predetermined interval is provided between the objective lens and the image forming lens so as to enable an epi-illumination (vertical illumination) optical system to be introduced. An exit pupil of the objective lens of the microscope generally exists inwardly of the objective lens, and hence, on the occasion of designing the image forming lens, the correction of the aberration is required to be done on the assumption that the exit pupil of the objective lens, i.e., the entrance pupil of the image forming lens exists in a position spaced at a predetermined interval from the foremost surface of the image forming lens. Further, the infinity-designed objective lens is utilized at the present, and therefore a mainstream apparatus is the microscope apparatus enabling a plurality of epi-illumination optical systems to be introduced by further expanding the interval between the objective lens and the image forming lens as the necessity may arise. On this occasion, a distance from the foremost surface of the image forming lens to the exit pupil of the objective lens is also elongated. The exit pupil of the objective lens serves as the entrance pupil for the image forming lens, and hence the image forming lens is required to cause none of fluctuation in aberration even when the position of the image forming lens gets away from the position of the exit pupil of the objective lens, i.e., the position of the entrance pupil of the image forming lens. If the position of the entrance pupil changes, there is a change in height at which the off-axis beams get incident on the image forming lens IL, with the result that an off-axis aberration fluctuates and positions of a sagittal image surface and of a meridional image surface change. Accordingly, if under the lower limit value of the conditional expression (7), the sagittal image surface and the meridional image surface becomes under when the exit pupil of the objective lens gets far from the image forming lens IL, which is an undesirable aspect. Whereas if over the upper limit value of the conditional expression (7), the sagittal image surface and the meridional image surface becomes over when the exit pupil of the objective lens gets far from the image forming lens IL, which is an undesirable aspect.

Moreover, it is desirable that the image forming lens IL satisfies the following conditional expression (8):

$$-3 < f1n/f1 < -0.5 \qquad (8)$$

where f1$n$ denotes a focal length of the positive lens (e.g., the biconvex lens L1) configuring the first lens group G1, and f1 denotes the focal length of the first lens group G1.

The conditional expression (8) represents a condition for correcting the aberration. If under the lower limit value of the conditional expression (8), the power of the negative lens configuring the first lens group G1 weakens, and therefore the chromatic aberration caused in the first lens group G1 can not be sufficiently corrected, which is an undesirable aspect. Whereas if over the upper limit value of the conditional expression (8), the power of the negative lens excessively strengthens, with the result that a high-order comatic aberration occurs to thereby bring about difficulty of the correction, which is an undesirable aspect.

Moreover, in the image forming lens IL, it is desirable that the first lens group G1 is constructed of a cemented lens formed by the biconvex lens cemented with the negative meniscus lens, of which cemented surface (a third surface in FIG. 1) has a concave surface facing objective side, and, in the case of this construction, it is desirable to satisfy the following conditional expression (9):

$$0.0010 < \Phi < 0.0030 \qquad (9)$$

where $\Phi$ denotes refractive power of the cemented surface of the cemented lens.

The conditional expression (9) represents a condition for correcting the aberration. If under the lower limit value of the conditional expression (9), the power of the cemented surface weakens, and therefore the chromatic aberration caused in the first lens group G1 can not be sufficiently corrected, which is an undesirable aspect. Whereas if over the upper limit value of the conditional expression (9), the power of the cemented surface excessively strengthens, with the result that the high-order comatic aberration occurs to thereby bring about the difficulty of the correction, which is an undesirable aspect.

EXAMPLES

In the following, five Examples of the image forming lens IL according to the present invention will be exemplified.

Example 1

FIG. 1 is a diagram illustrating a configuration of an image forming lens IL1 according to Example 1 of the present invention. The image forming lens IL1 is, as described above, constructed of, in order from the object side, the first lens group G1 having the positive refractive power and the second lens group G2 having the negative refractive power. The first lens group G1 is constructed of a cemented lens formed by the biconvex lens L1 cemented with the negative meniscus lens L2 having the concave surface facing the object side, and the second lens group G2 is constructed of a cemented lens formed by a meniscus lens L3 having the convex surface facing the object side and cemented with a positive meniscus lens L4 having the convex surface facing the object side. Note that the entrance pupil of the image forming lens IL1 is formed so as to be coincident with an exit pupil P of an unillustrated objective lens or positioned in the vicinity of the exit pupil P.

Following Table 1 gives various values of data in Example 1. In Table 1, a first column indicates a lens surface number along the direction in which the beams of light travel from the object side, a second column indicates a radius of curvature of each lens surface, a third column indicates a surface distance which represents a distance along an optical axis from each optical surface to the next optical surface, a fourth column indicates νdht expressed in the formula (a), a fifth column indicates nd which represents a refractive index with respect to the d-line (λ=587.56 nm), a sixth column indicates the partial dispersion ratio Pht expressed in the conditional expression (b), a seventh column indicates transmittance 1 which represents the transmittance of the glass material per glass thickness of 10 mm with respect to the light having a wavelength of 340 nm, and an eighth column indicates transmittance 2 which represents the transmittance of the glass material per glass thickness of 10 mm with respect to the light having a wavelength of 360 nm, respectively. Note that the surface numbers 1-7 given in Table 1 correspond to the surface numbers 1-7 shown in FIG. 1, and the first surface represents an exit pupil surface of the objective lens used together with the image forming lens IL1 according to Example 1. Further, the radius of curvature 0.000 represents a plane surface, and the refractive index of the air 1.000000 is omitted. Moreover, Table 1 also shows the values corresponding to the conditional expressions (1)-(9), i.e., [Values for Conditional Expressions]. Herein, [mm] is generally used as the unit of length with respect to the focal lengths fT, f1, fin, the radius of curvature, the surface distance, etc, which are written in all of the following data values, however, similar optical performance can be obtained even by an optical system proportionally enlarged or reduced its dimension, and is not therefore limited to the unit [mm]. It should be noted that the descriptions of these symbols and the description of the data table are the same as those in the following Examples.

TABLE 1

| i | r | d | νdht | nd | Pht | t1 | t2 |
|---|---|---|------|----|----|----|----|
| 1 | 0.000 | 160.000 | | | | | |
| 2 | 128.670 | 5.000 | 29.47 | 1.497820 | 1.494 | 80% | 97% |
| 3 | −65.000 | 3.000 | 20.32 | 1.622801 | 1.537 | 75% | 93% |
| 4 | −154.409 | 0.500 | | | | | |
| 5 | 84.000 | 3.000 | 15.67 | 1.613397 | 1.611 | 75% | 93% |
| 6 | 47.000 | 3.000 | 20.32 | 1.622801 | 1.537 | 75% | 93% |
| 7 | 69.966 | 186.441 | | | | | |

| [Values for Conditional Expressions] |
|---|
| (1) νdht1 = 29.5 |
| (2) νdht1 − νdht2 = 9.1 |
| (3) \|(Pht1 − Pht2)/(νdht1 − νdht2)\| = 0.00466 |
| (4) νdht3 = 20.3 |
| (5) νht3 − νdht4 = 4.7 |
| (6) \|(Pht3 − Pht4)/(νdht3 − νdht4)\| = 0.01604 |
| (7) f1/fT = 0.842 |
| (8) f1n/f1 = −1.084 |
| (9) Φ = 0.00192 |

In Table 1, "i" denotes a surface number, "r" denotes a radius of curvature, "d" denotes a surface distance to the next optical surface, "t1" denotes transmittance 1, and "t2" denotes transmittance 2.

Figure 2:
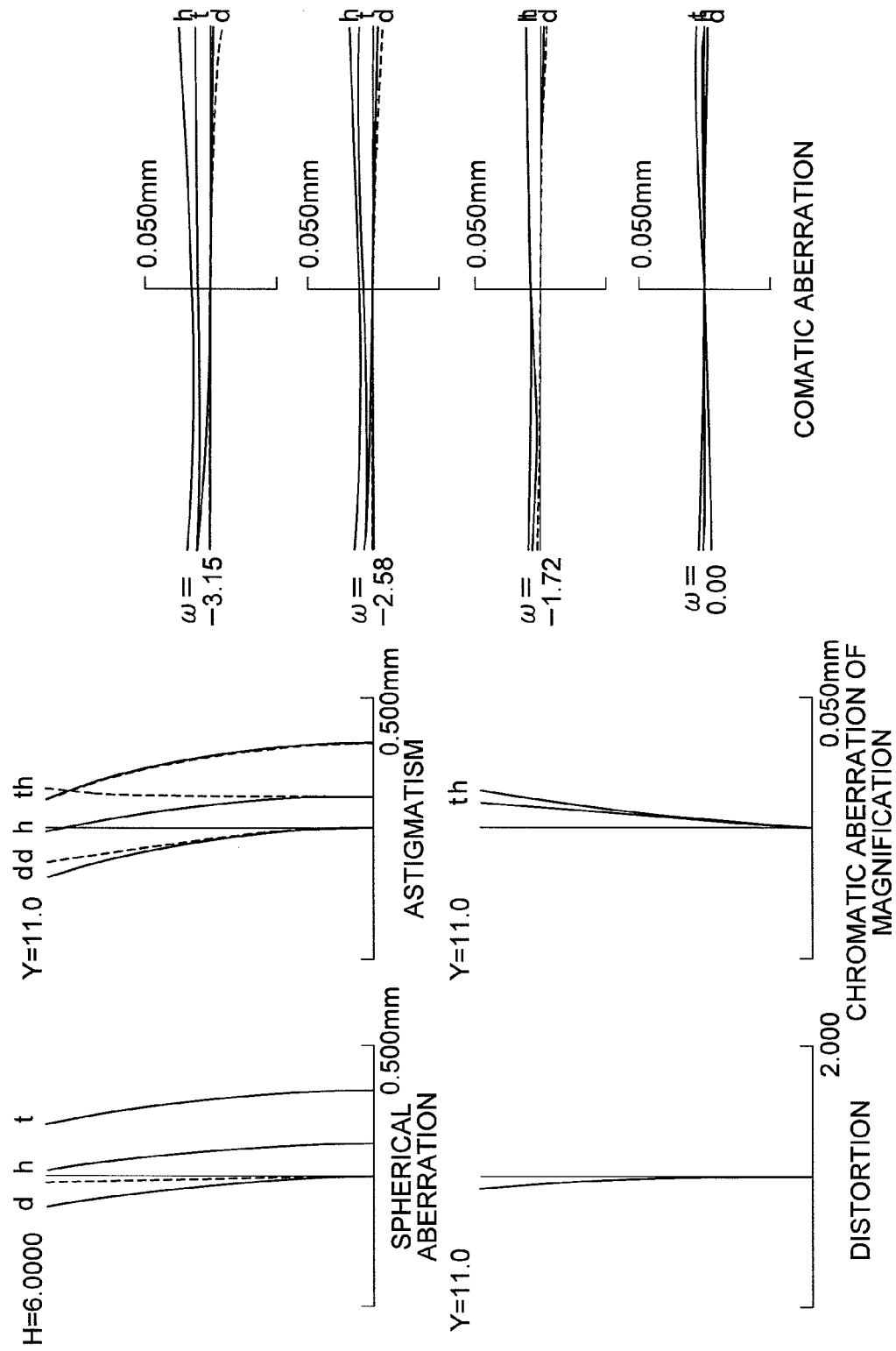
FIG. 2 is a diagram of various aberrations of the image forming lens according to Example 1.

Thus, it is understood that Example 1 satisfies all of the conditional expressions (1)-(9), and the transmittances of all the lenses configuring the image forming lens IL1 satisfy the conditions described above. FIG. 2 shows a diagram of the various aberrations that are a spherical aberration, astigmatism, a distortion, a chromatic aberration of magnification and a comatic aberration with respect to the light of t-line (λ=1013.98 nm), d-line (λ=587.56 nm) and h-line (λ=404.66 nm) in Example 1. Note that the vertical axis represents a value of a vertical height H from the optical axis in the spherical aberration graph, a value of an image height Y in the astigmatism graph, the distortion graph and the chromatic aberration-of-magnification graph, and an amount of aberration of a half-angle of view ω in the comatic aberration graph. Further, a broken line represents a meridional image plane and a solid line represents a sagittal image plane in the astigmatism graph, and the broken line represents a sine condition in the spherical aberration graph. The descriptions of the various aberration graphs are the same as those in the following Examples. As obvious from the various aberration graphs shown in FIG. 2, the on-axis chromatic aberration of the h-line is restrained within a half-focal depth 0.33 of the d-line with respect to the short wavelength side. Further, the on-axis chromatic aberration of the t-line is retrained within the half-focal depth 0.56 of the t-line with respect to the long wavelength side. Moreover, when considering the correction of the on-axis chromatic aberration and the correction of the chromatic aberration of the magnification in the wavelength range proximal to the d-line, it is desirable that both of the on-axis chromatic aberration and the chromatic aberration of the magnification of the h-line and the t-line take the positive values.

Figure 3:
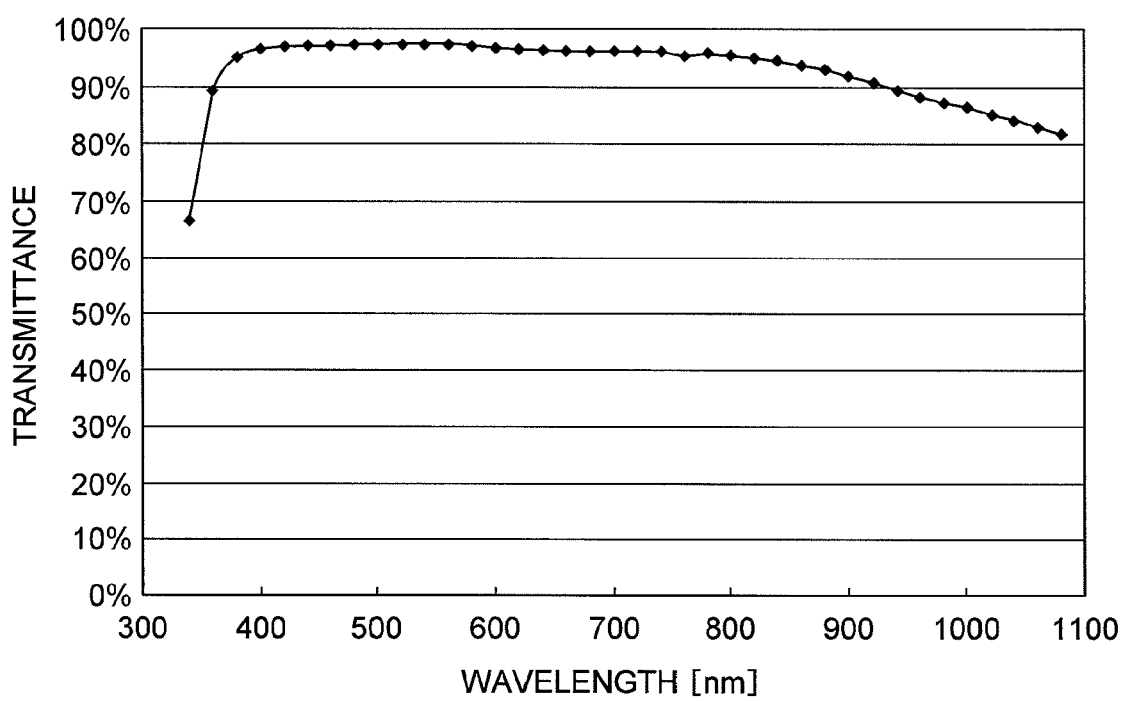
FIG. 3 is a graph showing a relationship between a wavelength and a transmittance in the image forming lens according to Example 1.
Figure 4:
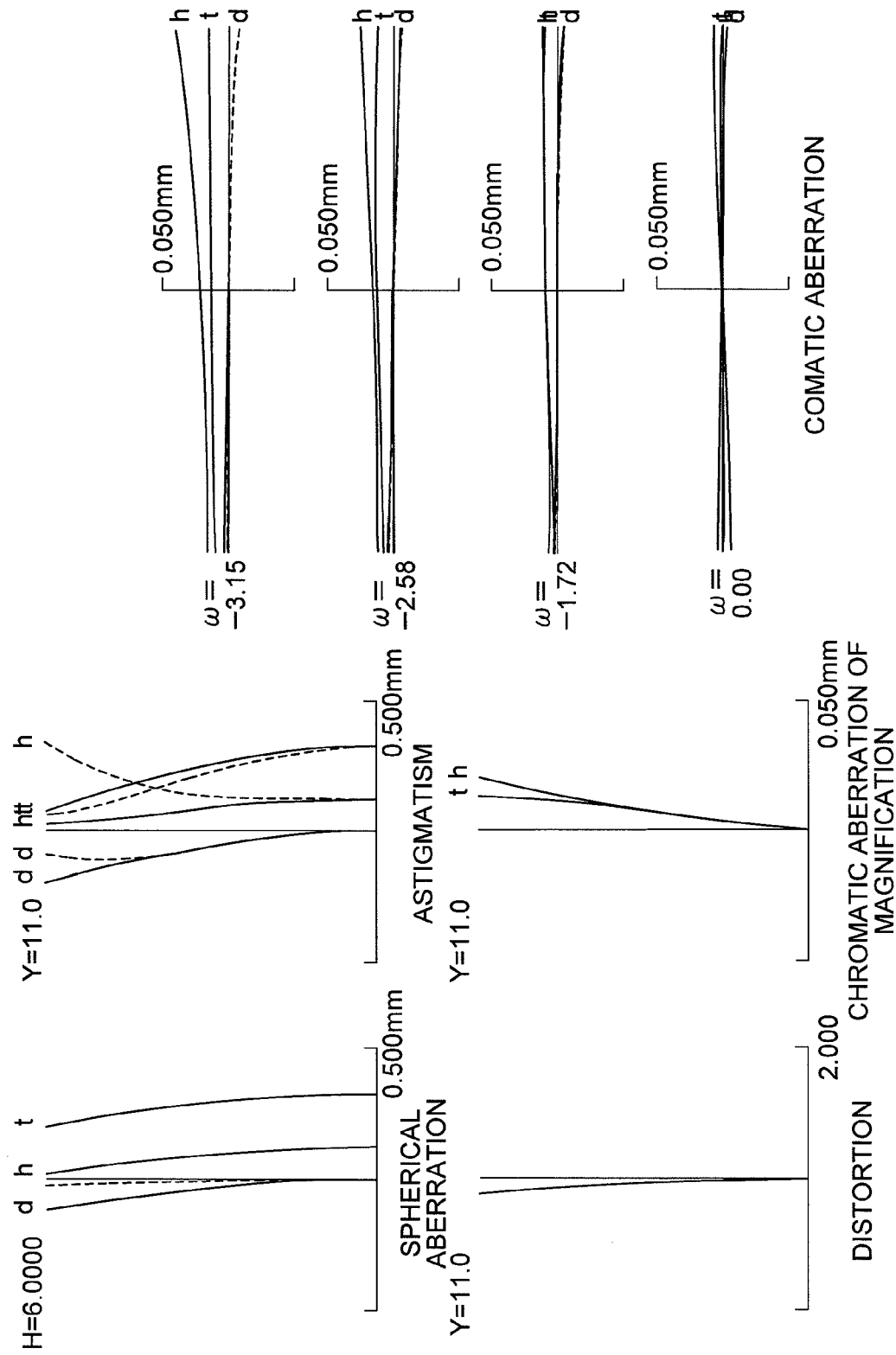
FIG. 4 is a diagram of the various aberrations on the occasion of extending a distance from an object side surface to an entrance pupil by 70 mm in Example 1.

Furthermore, FIG. 3 shows the transmittance of the image forming lens IL1 according to Example 1, and it is recognized from FIG. 3 that the high transmittance is maintained in the wide wavelength range. Further, FIG. 4 shows a diagram of the various aberrations on the occasion of extending a distance from the most object surface (which is the second surface in FIG. 1) of the image forming lens IL1 to the exit pupil P (which is the first surface in FIG. 1) of the objective lens by 70 mm, and it is recognized from FIG. 4 that the fluctuation of the aberration is restrained small.

Example 2

Figure 5:
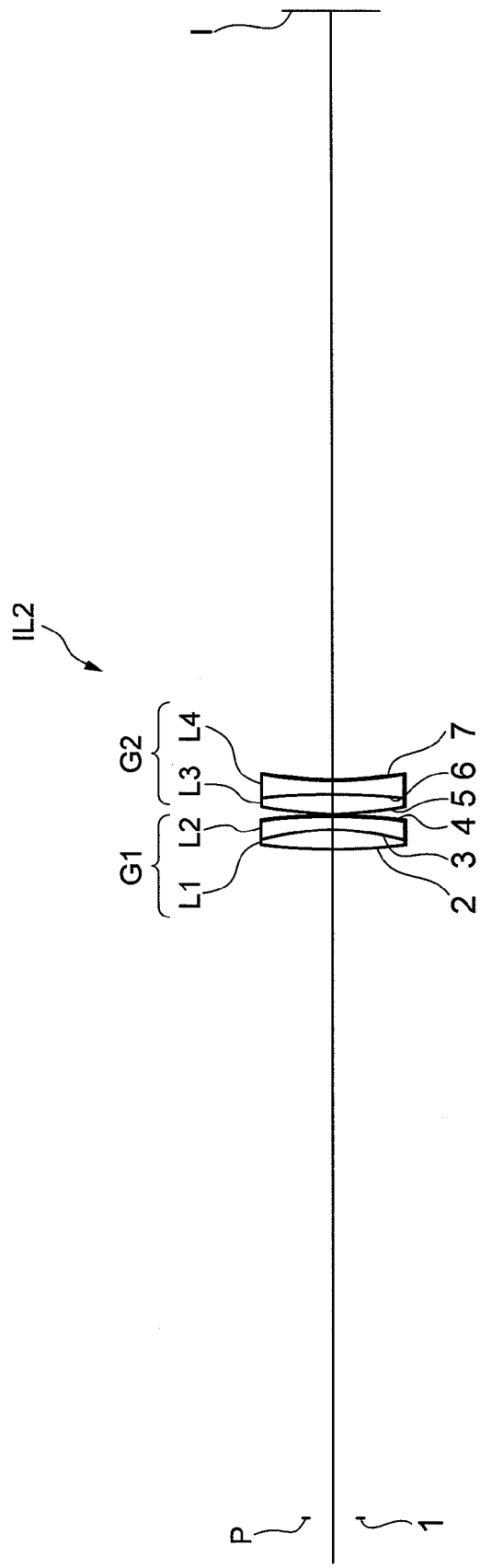
FIG. 5 is a lens configuration diagram illustrating a configuration of the image forming lens according to Example 2 of the present invention.

FIG. 5 is a diagram illustrating a construction of an image forming lens IL2 according to Example 2 of the present invention. The image forming lens IL2 is also, as described above, constructed of, in order from the object side, the first lens group G1 having the positive refractive power and the second lens group G2 having the negative refractive power. The first lens group G1 is constructed of a cemented lens formed by the biconvex lens L1 cemented with the negative meniscus lens L2 having the concave surface facing the object side, and the second lens group G2 is constructed of a cemented lens formed by the biconvex lens L3 cemented with the biconcave lens L4. Note that the entrance pupil of the image forming lens IL2 is formed so as to be coincident with the exit pupil P of the unillustrated objective lens or positioned in the vicinity of the exit pupil P.

Following Table 2 gives the various values of the data in Example 2. Note that the surface numbers 1-7 shown in Table 2 correspond to the surface numbers 1-7 shown in FIG. 5, and the first surface represents the exit pupil surface of the objective lens used together with the image forming lens IL2 according to Example 2.

TABLE 2

| i | r | d | vdht | nd | Pht | t1 | t2 |
|---|---|---|------|----|----|----|----|
| 1 | 0.000 | 160.000 | | | | | |
| 2 | 128.670 | 5.000 | 29.47 | 1.497820 | 1.494 | 80% | 97% |
| 3 | −56.000 | 3.000 | 19.93 | 1.568829 | 1.537 | 64% | 93% |
| 4 | −149.124 | 0.500 | | | | | |
| 5 | 97.408 | 5.000 | 22.54 | 1.516800 | 1.423 | 95% | 99% |
| 6 | −150.000 | 3.000 | 19.93 | 1.568829 | 1.537 | 64% | 93% |
| 7 | 83.883 | 183.994 | | | | | |

[Values for Conditional Expressions]

(1) vdht1 = 29.5
(2) vdht1 − vdht2 = 9.5
(3) |(Pht1 − Pht2)/(vdht1 − vdht2)| = 0.00452
(4) vdht3 = 22.5
(5) vdht3 − vdht4 = 2.6
(6) |(Pht3 − Pht4)/(vdht3 − vdht4)| = 0.04380
(7) f1/fT = 0.786
(8) f1n/f1 = −0.947
(9) Φ = 0.00127

Figure 6:
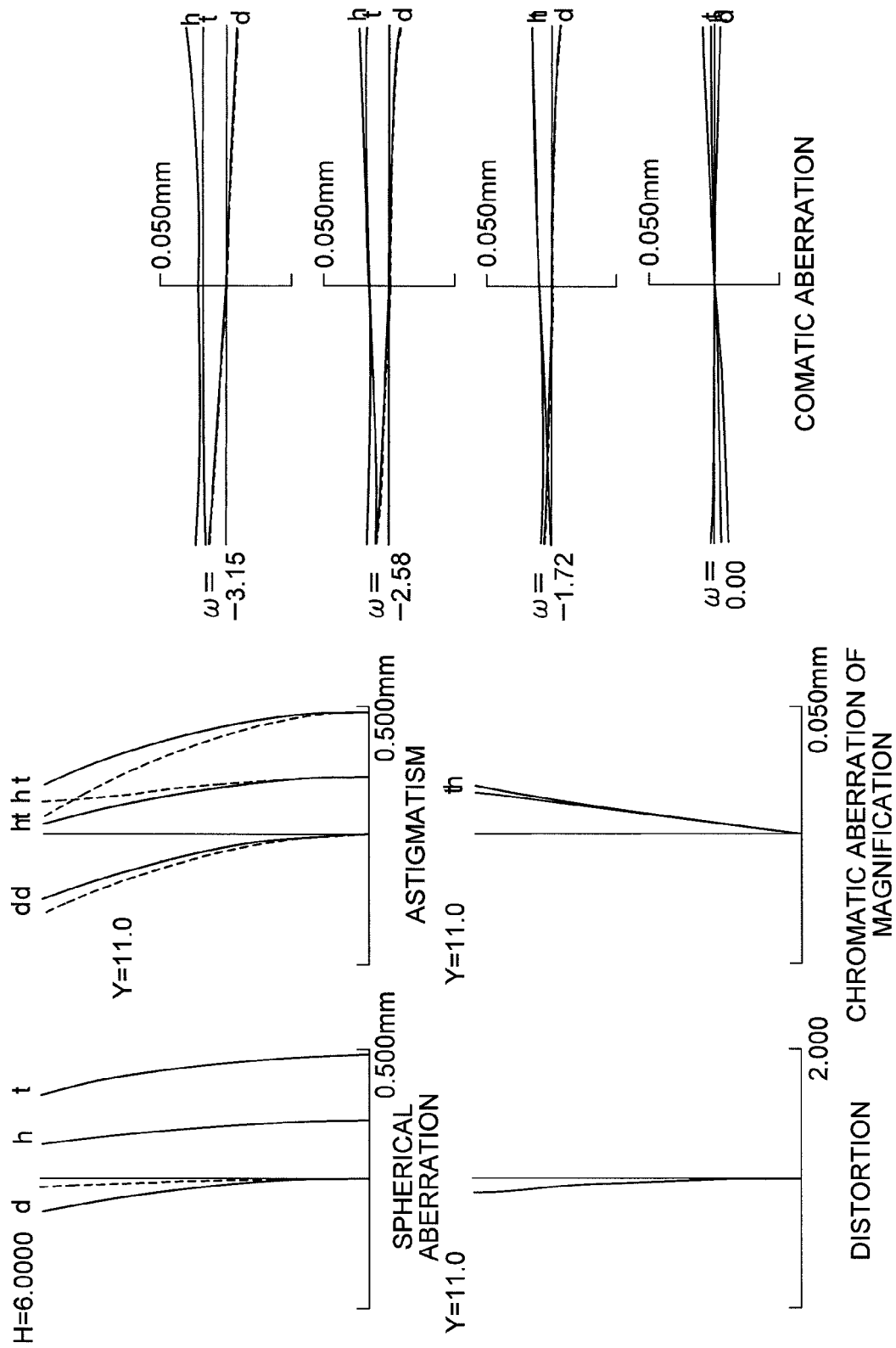
FIG. 6 is a diagram of the various aberrations of the image forming lens according to Example 2.
Figure 7:
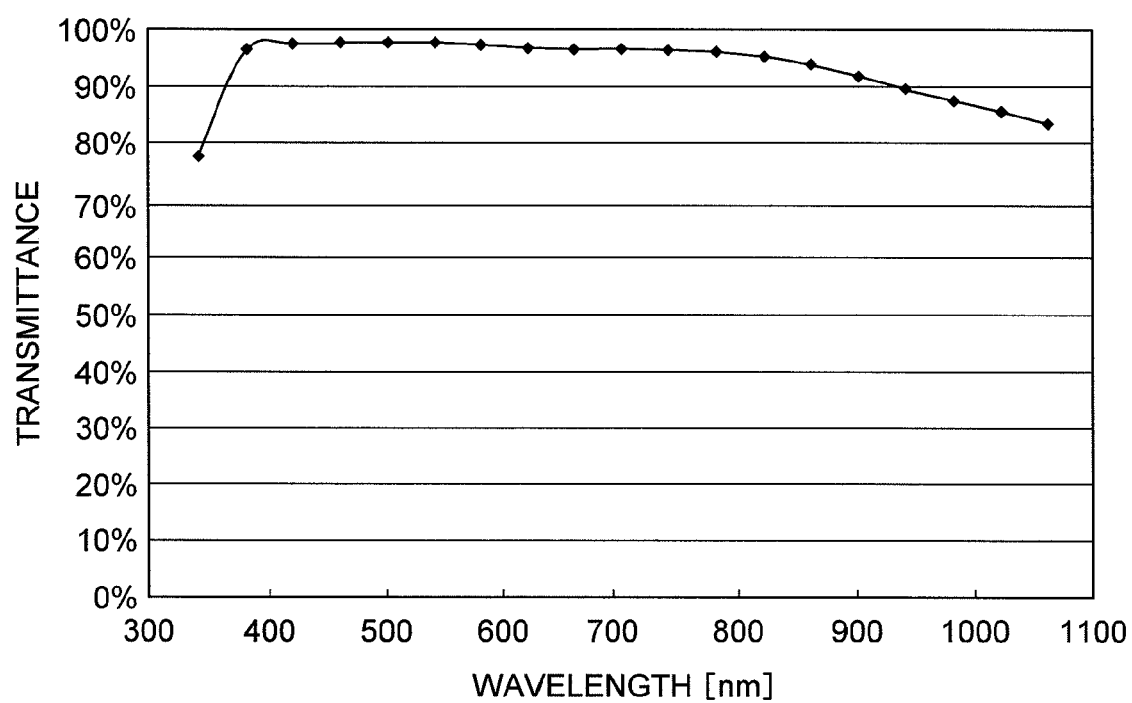
FIG. 7 is a graph showing the relationship between the wavelength and the transmittance in the image forming lens according to Example 2.
Figure 8:
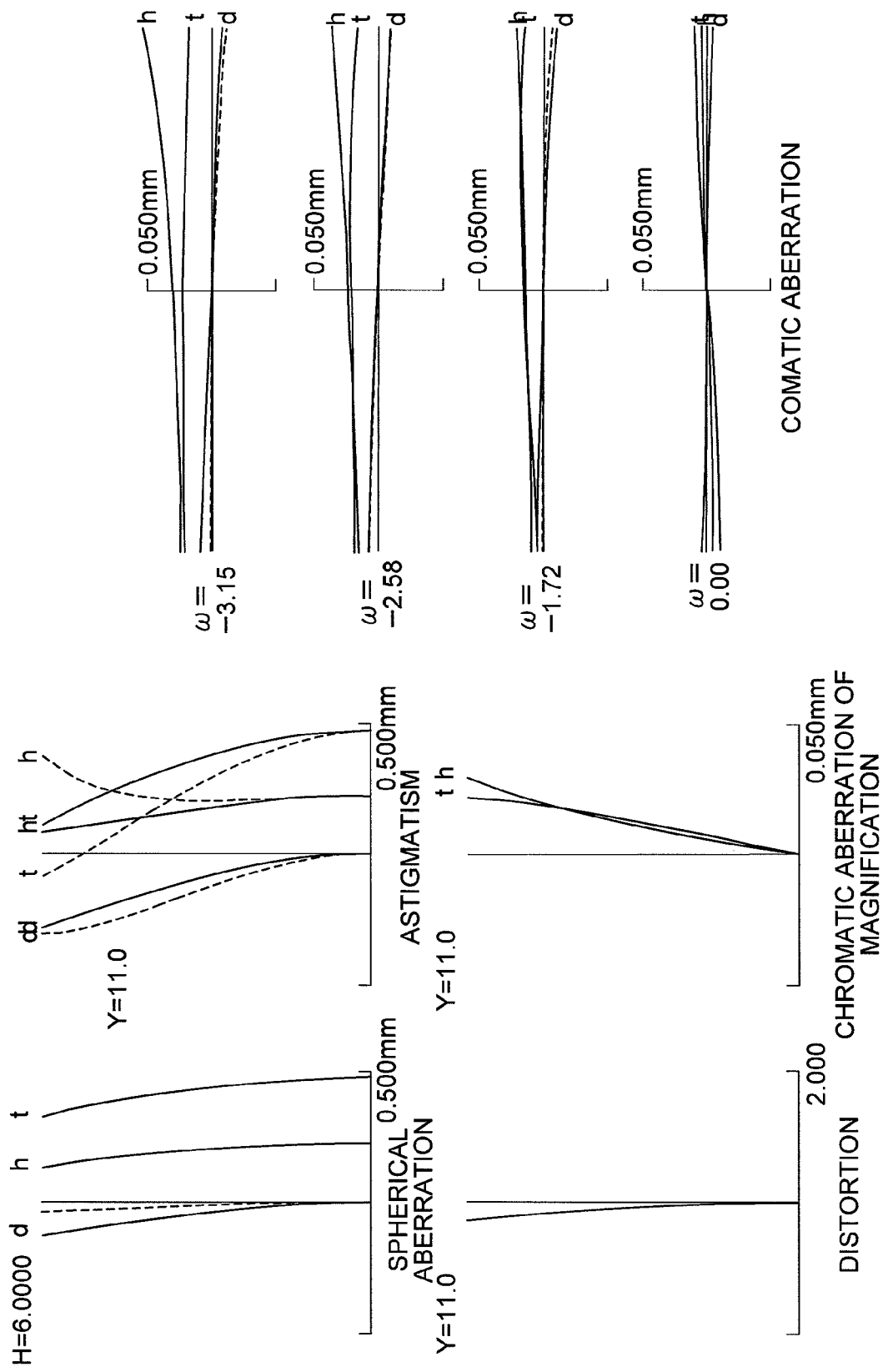
FIG. 8 is a diagram of the various aberrations on the occasion of extending the distance from the object side surface to the entrance pupil by 70 mm in Example 2.

Thus, it is understood that Example 2 satisfies all of the conditional expressions (1)-(9), and the transmittances of all the lenses configuring the image forming lens IL2 satisfy the conditions described above. FIG. 6 shows a diagram of the various aberrations that are the spherical aberration, the astigmatism, the distortion, the chromatic aberration of the magnification and the comatic aberration with respect to the light of the t-line, the d-line and the h-line in Example 2. As apparent from the various aberration graphs shown in FIG. 6, similarly to Example 1, the various aberrations are well corrected from the short wavelength range side to the long wavelength range side. Further, FIG. 7 shows the transmittance of the image forming lens IL2 according to Example 2, and it is recognized from FIG. 7 that the high transmittance is maintained in the wide wavelength range. Furthermore, FIG. 8 shows a diagram of the various aberrations on the occasion of extending the distance from the most object side surface (which is the second surface in FIG. 5) of the image forming lens IL2 to the exit pupil P of the objective lens by 70 mm, and it is recognized from FIG. 8 that the fluctuation of the aberration is restrained small.

Example 3

Figure 9:
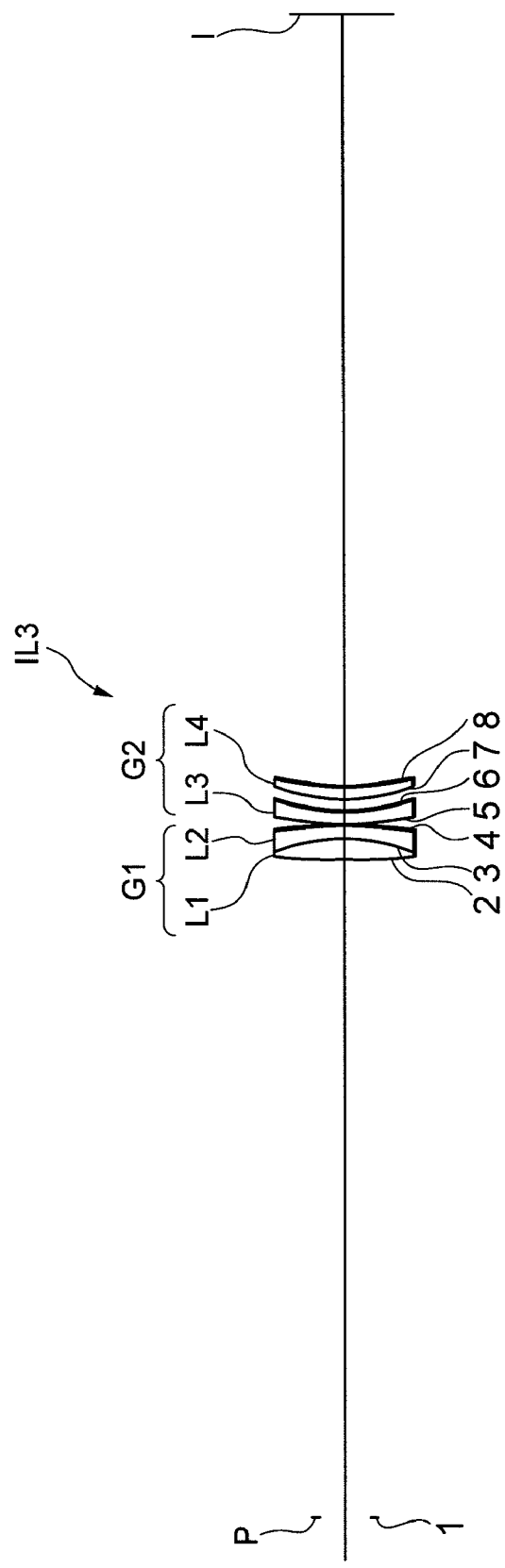
FIG. 9 is a lens configuration diagram illustrating a configuration of the image forming lens according to Example 3 of the present invention.

FIG. 9 is a diagram illustrating a construction of an image forming lens IL3 according to Example 3 of the present invention. The image forming lens IL3 is also, as described above, constructed of, in order from the object side, the first lens group G1 having the positive refractive power and the second lens group G2 having the negative refractive power. The first lens group G1 is constructed of a cemented lens formed by the biconvex lens L1 cemented with the negative meniscus lens L2 having the concave surface facing the object side, and the second lens group G2 is constructed of the negative meniscus lens L3 having the convex surface facing the object side and the positive meniscus lens L4 having the convex surface facing the object side. Note that the entrance pupil of the image forming lens IL3 is formed so as to be coincident with the exit pupil P of the unillustrated objective lens or positioned in the vicinity of the exit pupil P.

Following Table 3 gives the various values of the data in Example 3. Note that the surface numbers 1-8 shown in Table 3 correspond to the surface numbers 1-8 shown in FIG. 9, and the first surface represents the exit pupil surface of the objective lens used together with the image forming lens IL3 according to Example 3.

TABLE 3

| i | r | d | vdht | nd | Pht | t1 | t2 |
|---|---|---|------|-----|-----|-----|-----|
| 1 | 0.000 | 160.000 | | | | | |
| 2 | 210.000 | 5.000 | 24.59 | 1.592400 | 1.566 | 90% | 98% |
| 3 | −45.500 | 3.000 | 19.14 | 1.713000 | 1.510 | 68% | 87% |
| 4 | −122.832 | 0.500 | | | | | |
| 5 | 84.000 | 3.000 | 15.67 | 1.613397 | 1.611 | 75% | 93% |
| 6 | 50.000 | 3.000 | | | | | |
| 7 | 44.722 | 3.000 | 22.54 | 1.516800 | 1.423 | 95% | 99% |
| 8 | 65.041 | 187.000 | | | | | |

[Values for Conditional Expressions]

(1) vdht1 = 24.6
(2) vdht1 − vdht2 = 5.5
(3) |(Pht1 − Pht2)/(vdht1 − vdht2)| = 0.01018
(4) vdht3 = 22.5
(5) vdht3 − vdht4 = 6.9
(6) |(Pht3 − Pht4)/(vdht3 − vdht4)| = 0.02744
(7) f1/fT = 0.841
(8) f1n/f1 = −0.613
(9) Φ = 0.00265

Figure 10:
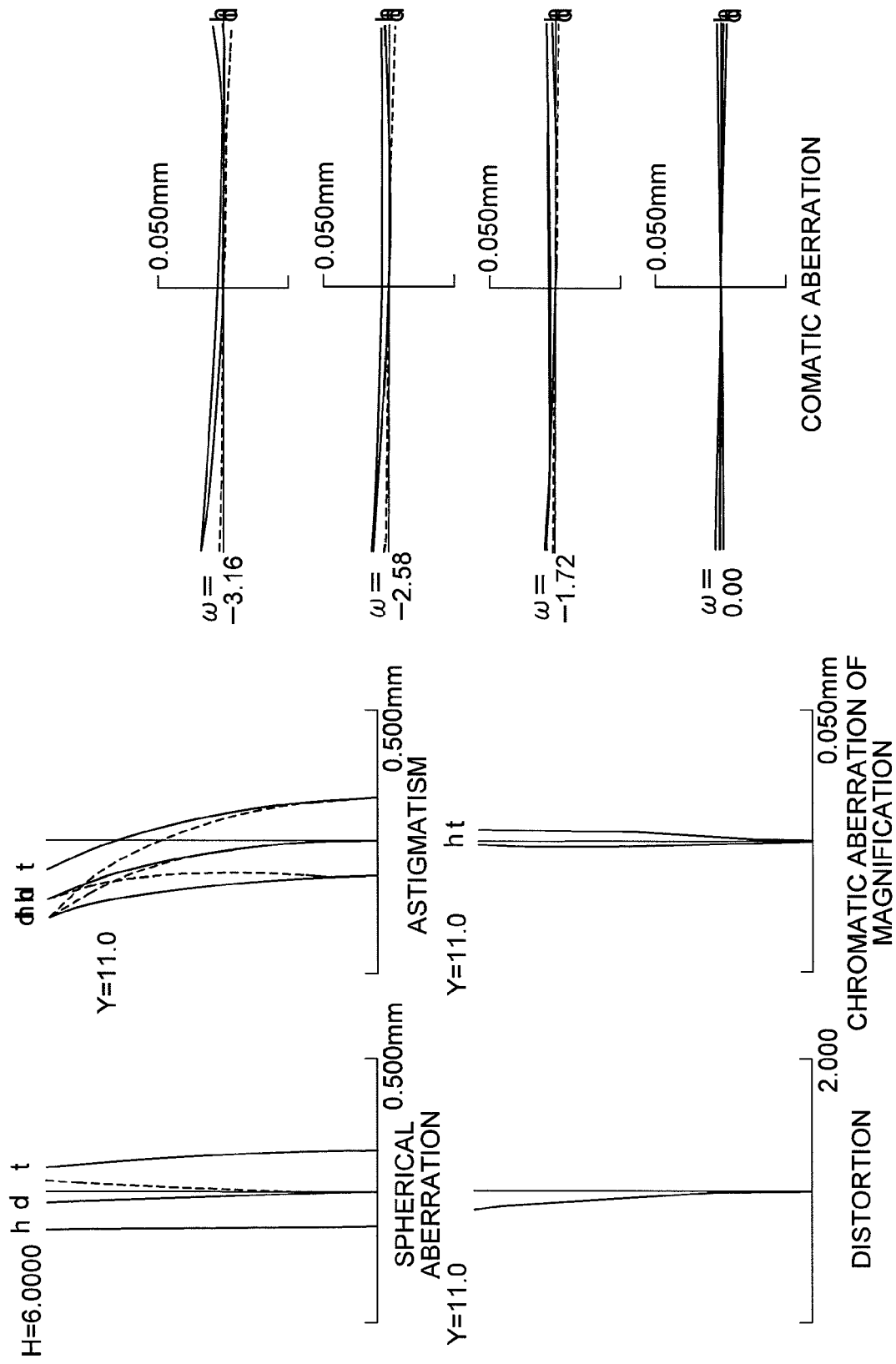
FIG. 10 is a diagram of the various aberrations of the image forming lens according to Example 3.
Figure 11:
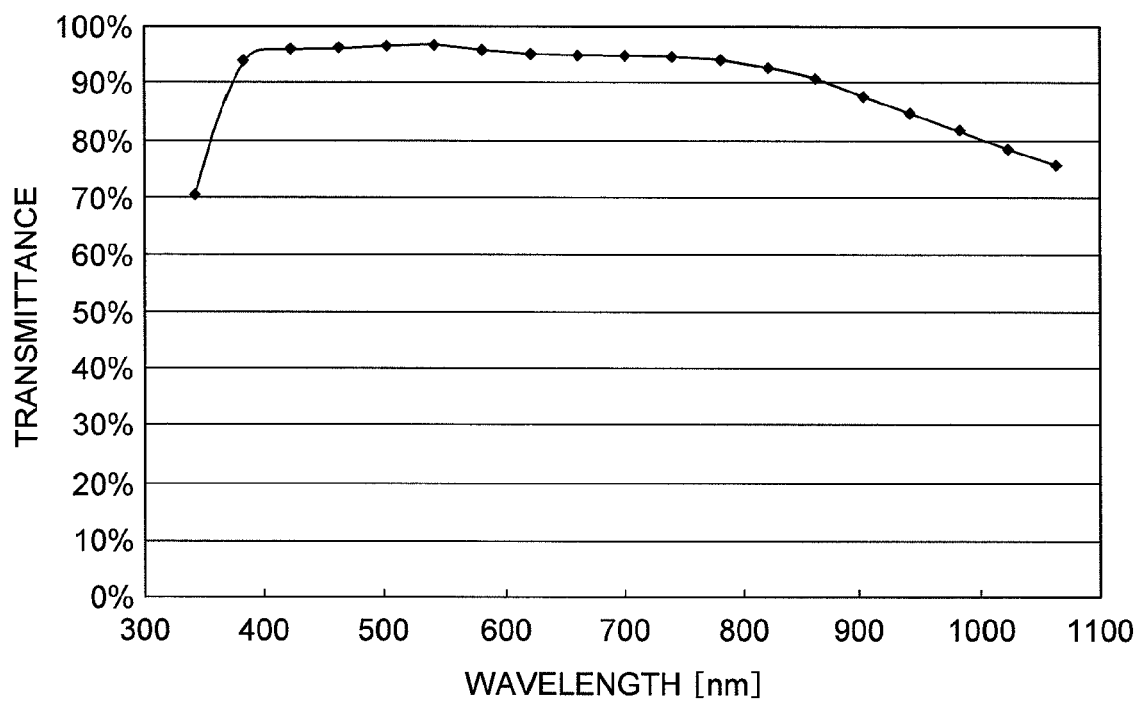
FIG. 11 is a graph showing the relationship between the wavelength and the transmittance in the image forming lens according to Example 3.
Figure 12:
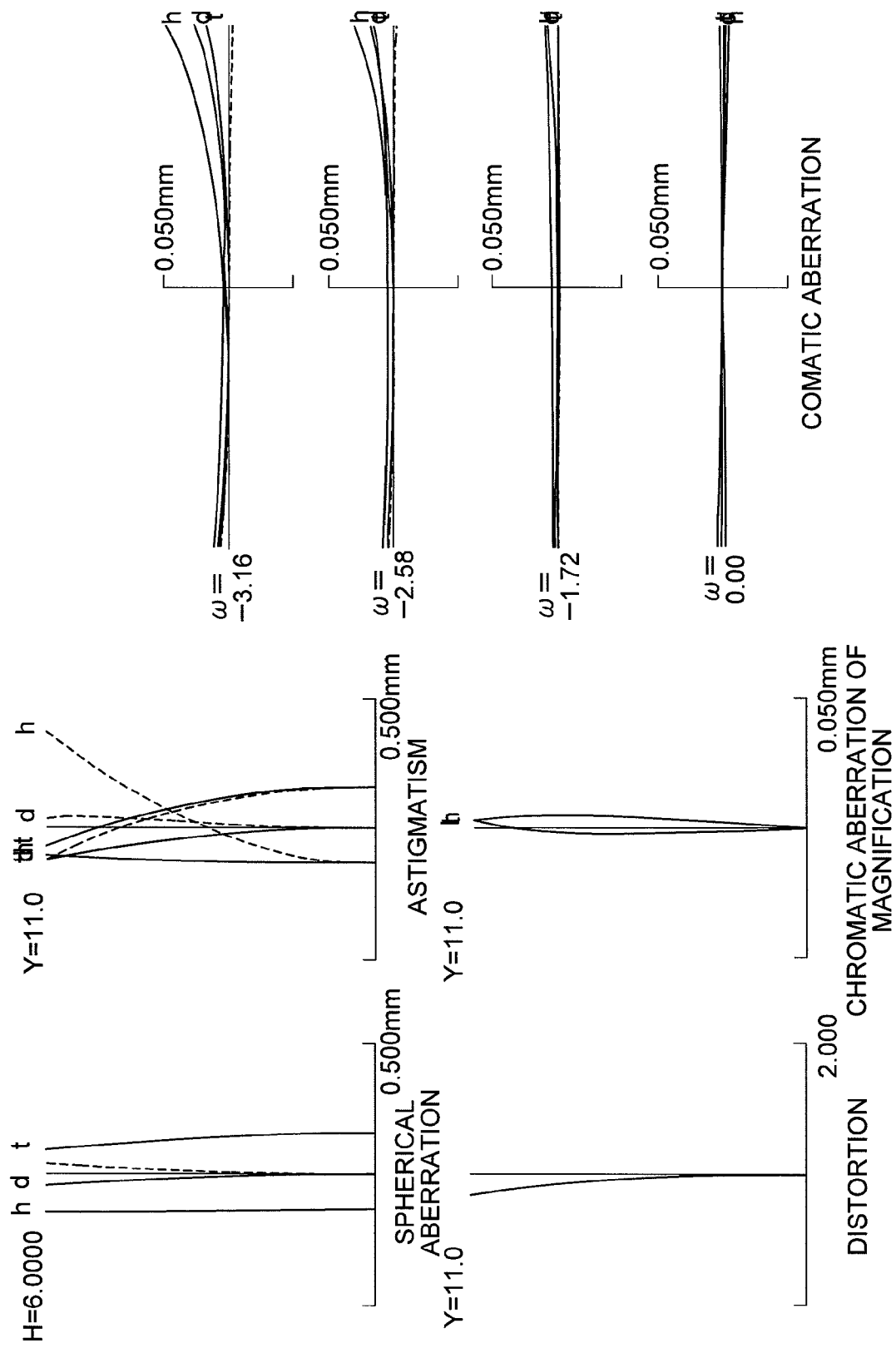
FIG. 12 is a diagram of the various aberrations on the occasion of extending the distance from the object side surface to the entrance pupil by 70 mm in Example 3.

Thus, it is understood that Example 3 satisfies all of the conditional expressions (1)-(9), and the transmittances of all the lenses configuring the image forming lens IL3 satisfy the conditions described above. FIG. 10 shows a diagram of the various aberrations that are the spherical aberration, the astigmatism, the distortion, the chromatic aberration of the magnification and the comatic aberration with respect to the light of the t-line, the d-line and the h-line in Example 3. As apparent from the various aberration graphs shown in FIG. 10, similarly to Example 1, the various aberrations are well corrected from the short wavelength range side to the long wavelength range side. Further, FIG. 11 shows the transmittance of the image forming lens IL3 according to Example 3, and it is recognized from FIG. 3 that the high transmittance is maintained in the wide wavelength range. Furthermore, FIG. 12 shows a diagram of the various aberrations on the occasion of extending the distance from the most object side surface (which is the second surface in FIG. 9) of the image forming lens IL3 to the exit pupil P of the objective lens by 70 mm, and it is recognized from FIG. 12 that the fluctuation of the aberration is restrained small.

Example 4

Figure 13:
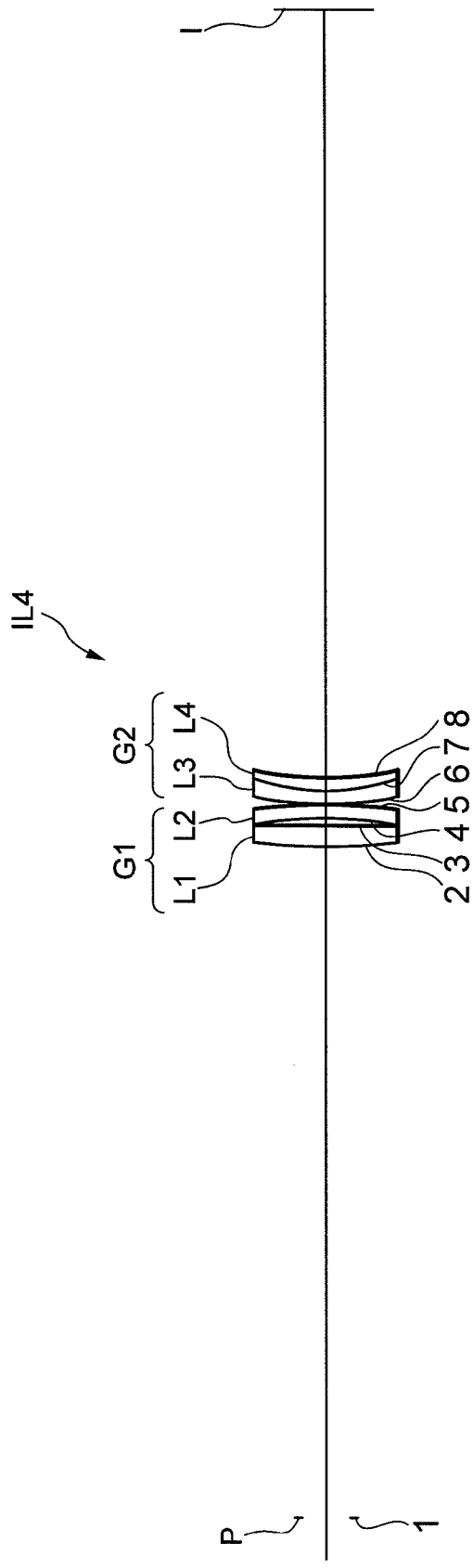
FIG. 13 is a lens configuration diagram illustrating a configuration of the image forming lens according to Example 4 of the present invention.

FIG. 13 is a diagram illustrating a construction of an image forming lens IL4 according to Example 4 of the present invention. The image forming lens IL4 is also, as described above, constructed of, in order from the object side, the first lens group G1 having the positive refractive power and the second lens group G2 having the negative refractive power. The first lens group G1 is constructed of the biconvex lens L1 and the negative meniscus lens L2 having the concave surface facing the object side, and the second lens group G2 is constructed of a cemented lens formed by the negative meniscus lens L3 having the convex surface facing the object side and cemented with the positive meniscus lens L4 having the convex surface facing the object side. Note that the entrance pupil of the image forming lens IL4 is formed so as to be coincident with the exit pupil P of the unillustrated objective lens or positioned in the vicinity of the exit pupil P.

Following Table 4 gives the various values of the data in Example 4. Note that the surface numbers 1-8 shown in Table 4 correspond to the surface numbers 1-8 shown in FIG. 13, and the first surface represents the exit pupil surface of the objective lens used together with the image forming lens IL4 according to Example 4. Herein, in the image forming lens IL4 in Example 4, the first lens group G1 is not constructed of the cemented lens, and hence the conditional expression (9) is not applied.

TABLE 4

| i | r | d | vdht | nd | Pht | t1 | t2 |
|---|---|---|------|-----|-----|-----|-----|
| 1 | 0.000 | 160.000 | | | | | |
| 2 | 128.597 | 5.000 | 29.47 | 1.497820 | 1.494 | 80% | 97% |
| 3 | −112.000 | 2.000 | | | | | |
| 4 | −94.582 | 3.000 | 14.06 | 1.654115 | 1.684 | 47% | 83% |
| 5 | −144.659 | 0.500 | | | | | |
| 6 | 84.000 | 3.000 | 15.67 | 1.613397 | 1.611 | 75% | 93% |
| 7 | 48.000 | 3.000 | 20.83 | 1.612720 | 1.516 | 72% | 94% |
| 8 | 70.594 | 183.363 | | | | | |

[Values for Conditional Expressions]

(1) vdht1 == 29.5
(2) vdht1 − vdht2 = 15.4
(3) |(Pht1 − Pht2)/(vdht1 − vdht2)| = 0.01229
(4) vdht3 = 20.8
(5) vdht3 − vdht4 = 5.2
(6) |(Pht3 − Pht4)/(vdht3 − vdht4)| = 0.01849
(7) f1/fT = 0.844
(8) f1n/f1 = −2.534

Figure 14:
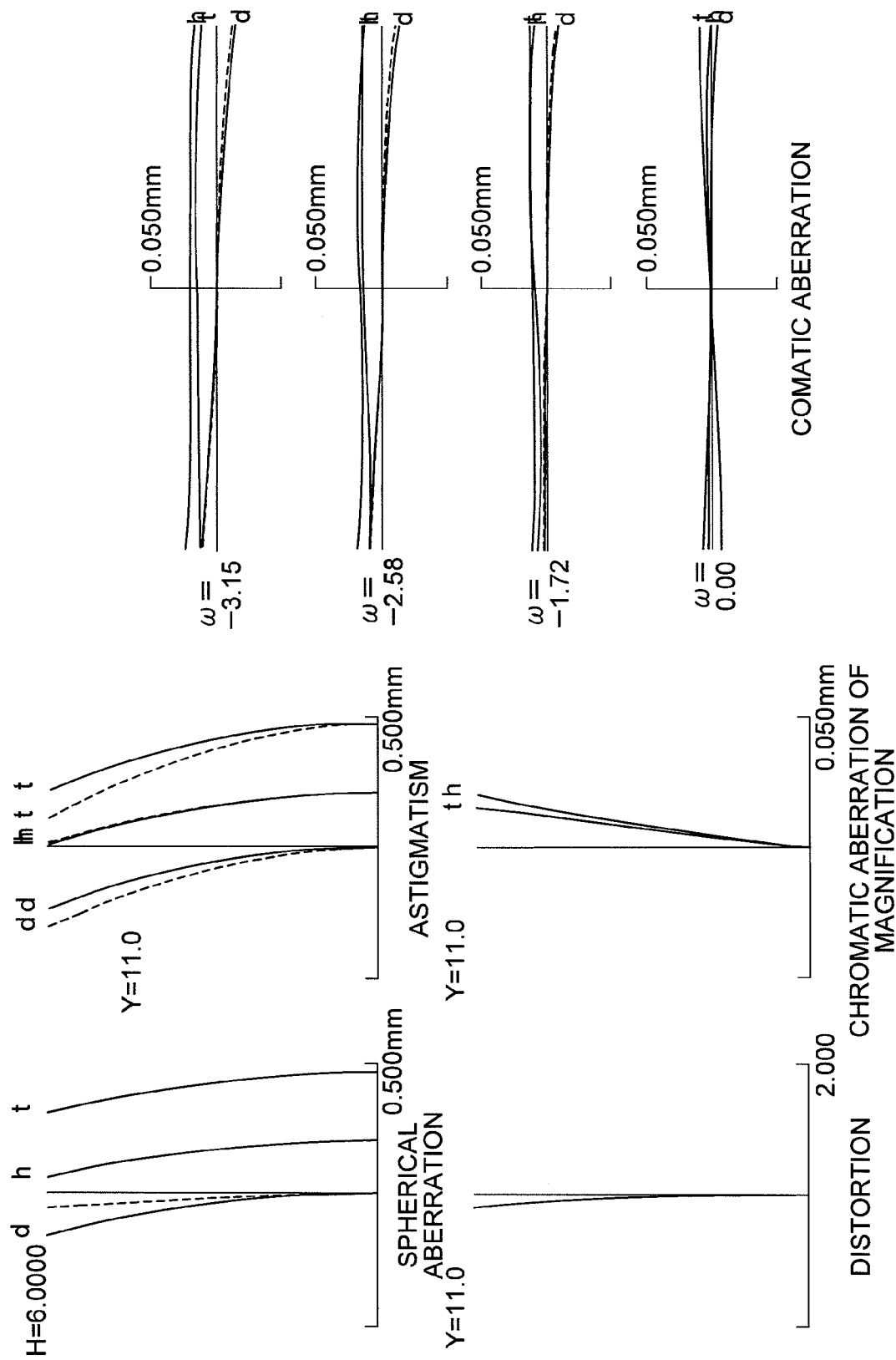
FIG. 14 is a diagram of the various aberrations of the image forming lens according to Example 4.
Figure 15:
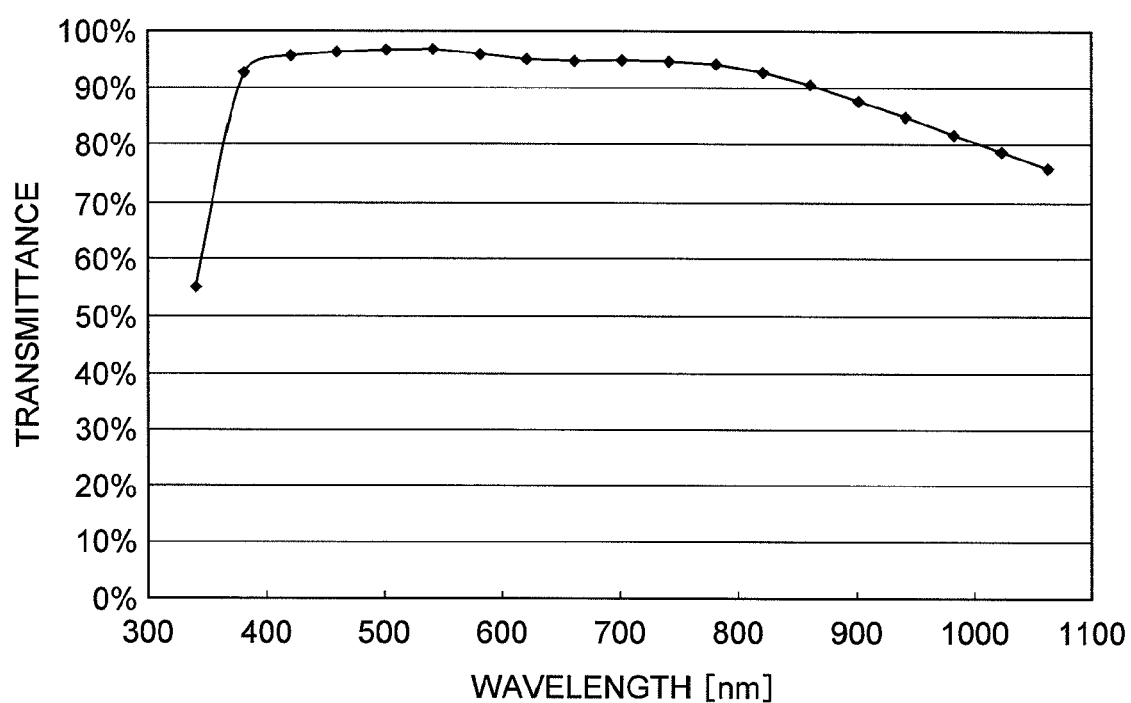
FIG. 15 is a graph showing the relationship between the wavelength and the transmittance in the image forming lens according to Example 4.
Figure 16:
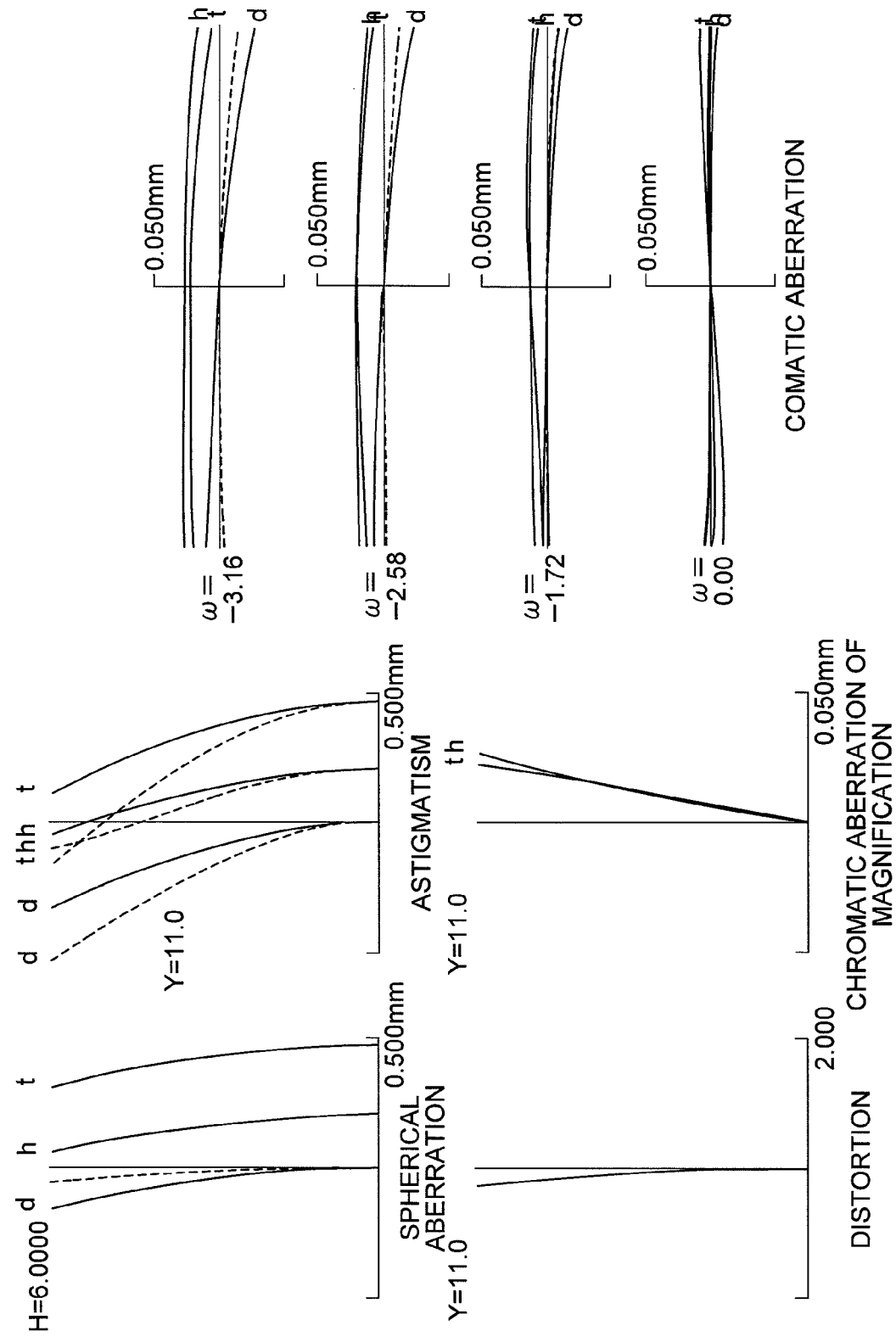
FIG. 16 is a diagram of the various aberrations on the occasion of extending the distance from the object side surface to the entrance pupil by 70 mm in Example 4.

Thus, it is understood that Example 4 satisfies the conditional expressions (1)-(8), and the transmittances of all the lenses configuring the image forming lens IL4 satisfy the conditions described above. FIG. 14 shows a diagram of the various aberrations that are the spherical aberration, the astigmatism, the distortion, the chromatic aberration of the magnification and the comatic aberration with respect to the light of the t-line, the d-line and the h-line in Example 4. As apparent from the various aberration graphs shown in FIG. 14, similarly to Example 1, the various aberrations are well corrected from the short wavelength range side to the long wavelength range side. Further, FIG. 15 shows the transmittance of the image forming lens IL4 according to Example 4, and it is recognized from FIG. 15 that the high transmittance is maintained in the wide wavelength range. Furthermore, FIG. 16 shows a diagram of the various aberrations on the occasion of extending the distance from the most object side surface (which is the second surface in FIG. 13) of the image forming lens IL4 to the exit pupil P of the objective lens by 70 mm, and it is recognized from FIG. 16 that the fluctuation of the aberration is restrained small.

Example 5

Figure 17:
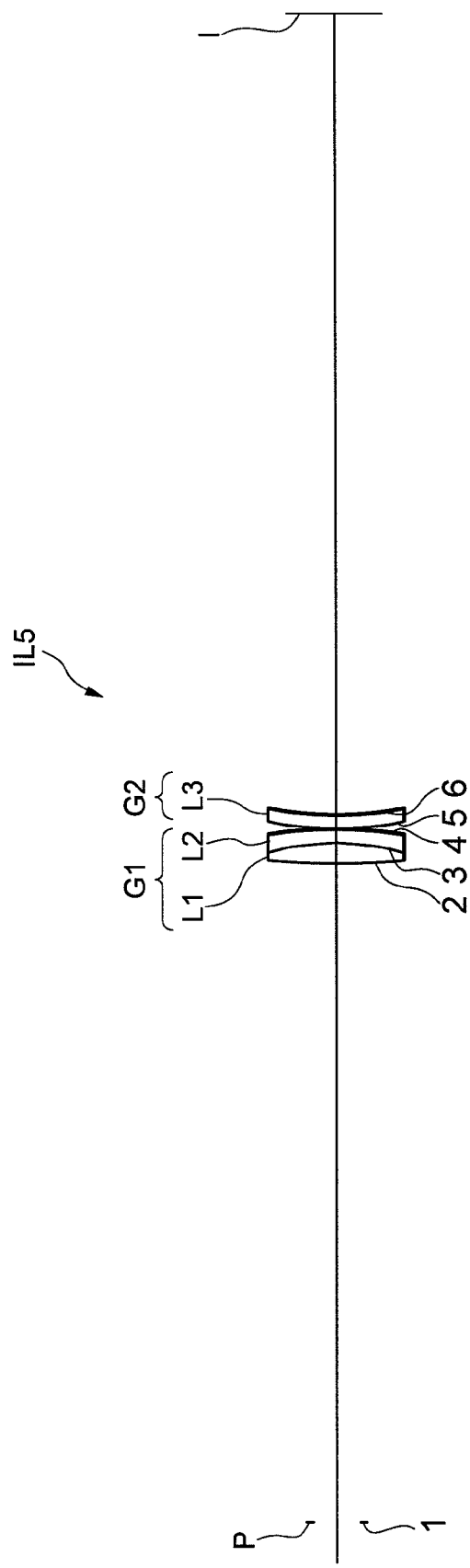
FIG. 17 is a lens configuration diagram illustrating a configuration of the image forming lens according to Example 5 of the present invention.

FIG. 17 is a diagram illustrating a construction of an image forming lens IL5 according to Example 5 of the present invention. The image forming lens IL5 is also, as described above, constructed of, in order from the object side, the first lens group G1 having the positive refractive power and the second lens group G2 having the negative refractive power. The first lens group G1 is constructed of the cemented lens formed by the biconvex lens L1 cemented with the negative meniscus lens L2 having the concave surface facing the object side, and the second lens group G2 is constructed of the negative meniscus lens L3 having the convex surface facing the object side. Note that the entrance pupil of the image forming lens IL5 is formed so as to be coincident with the exit pupil P of the unillustrated objective lens or positioned in the vicinity of the exit pupil P.

Following Table 5 gives the various values of the data in Example 5. Note that the surface numbers 1-6 shown in Table 5 correspond to the surface numbers 1-6 shown in FIG. 17, and the first surface represents the exit pupil surface of the objective lens used together with the image forming lens IL5 according to Example 5. Herein, in the image forming lens IL5 in Example 5, the second lens group G2 is constructed of the single lens (the negative meniscus lens L3), and hence the conditional expressions (4)-(6) are not applied.

TABLE 5

| i | r | d | vdht | nd | Pht | t1 | t2 |
|---|---|---|------|----|----|----|----|
| 1 | 0.000 | 160.000 | | | | | |
| 2 | 150.000 | 5.000 | 29.47 | 1.497820 | 1.494 | 80% | 97% |
| 3 | −62.000 | 3.000 | 15.67 | 1.613397 | 1.611 | 75% | 93% |
| 4 | −135.473 | 0.500 | | | | | |
| 5 | 85.000 | 3.000 | 22.54 | 1.516800 | 1.423 | 95% | 99% |
| 6 | 70.927 | 194.803 | | | | | |

[Values for Conditional Expressions]

(1) vdht1 = 29.5
(2) vdht1 − vdht2 = 13.8
(3) |(Pht1 − Pht2)/(vdht1 − vdht2)| = 0.00850
(7) f1/fT = 0.842
(8) f1n/f1 = −1.125
(9) Φ = 0.00186

Figure 18:
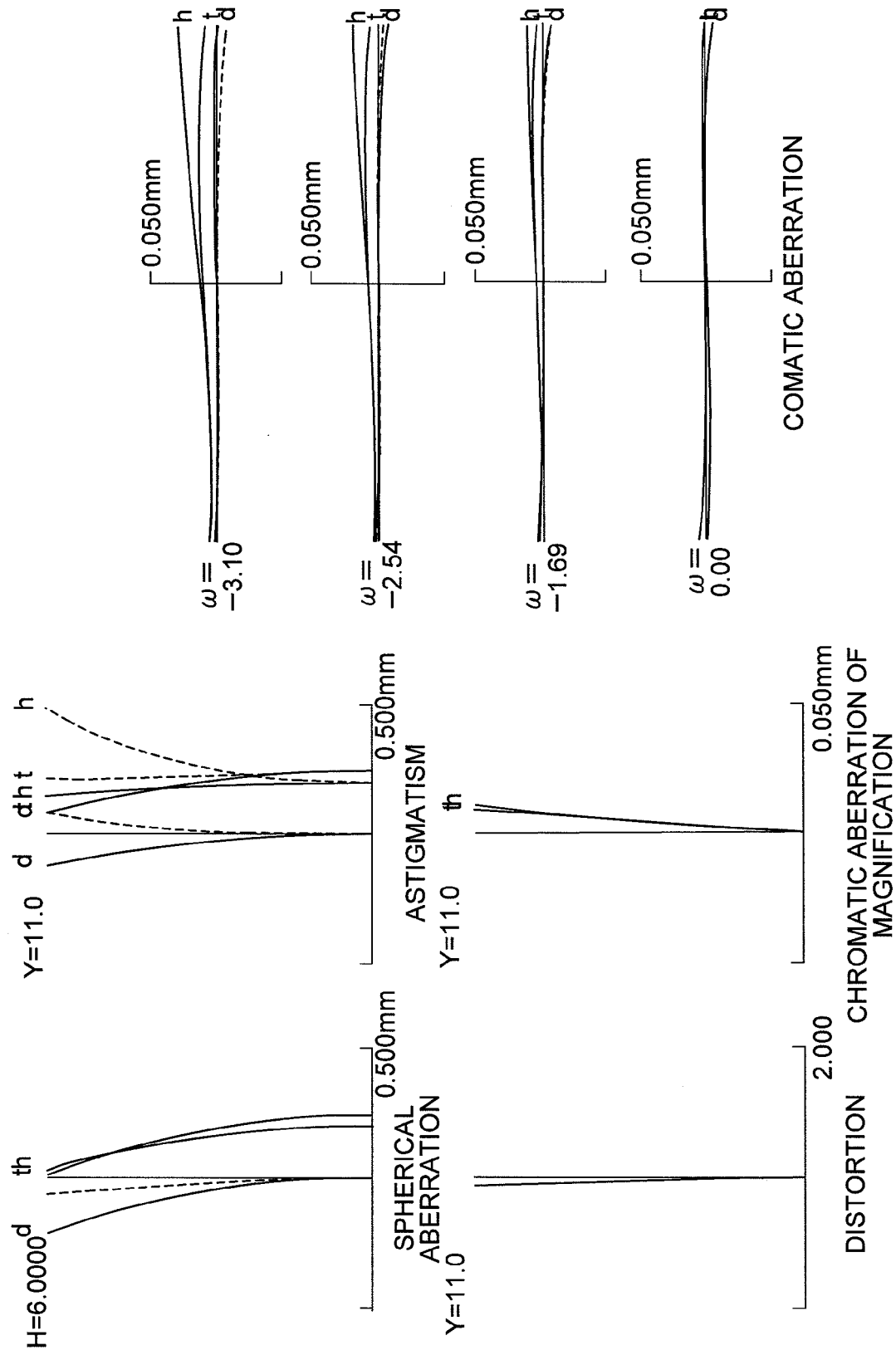
FIG. 18 is a diagram of the various aberrations of the image forming lens according to Example 5.
Figure 19:
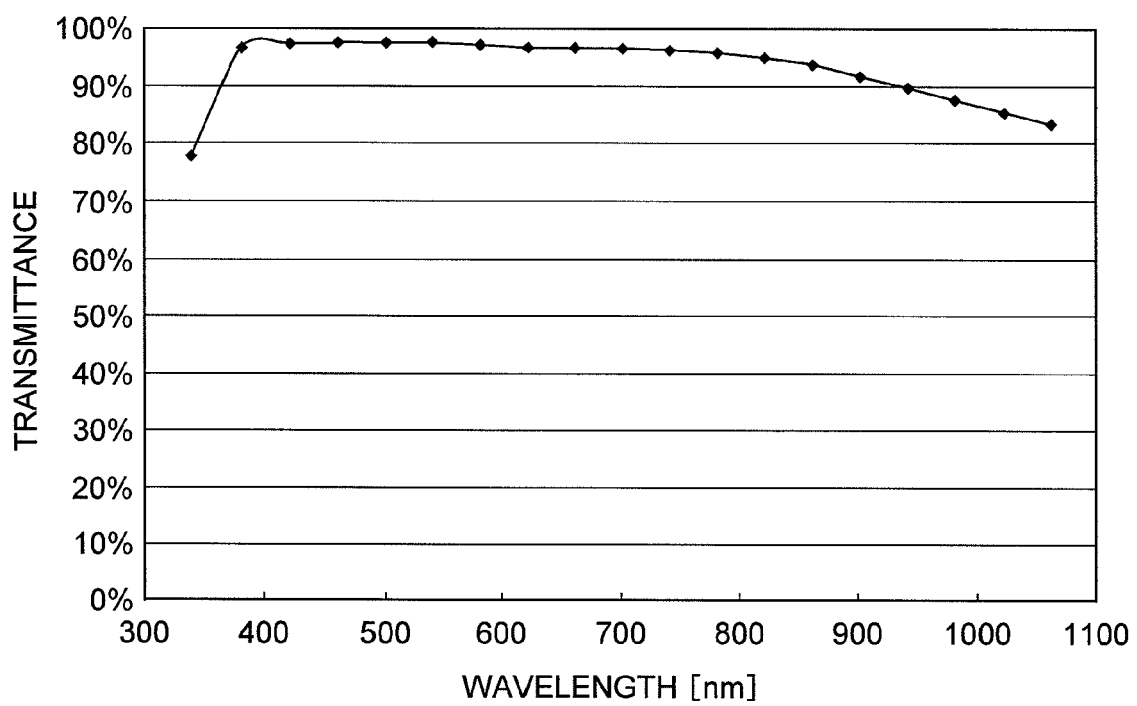
FIG. 19 is a graph showing the relationship between the wavelength and the transmittance in the image forming lens according to Example 5.
Figure 20:
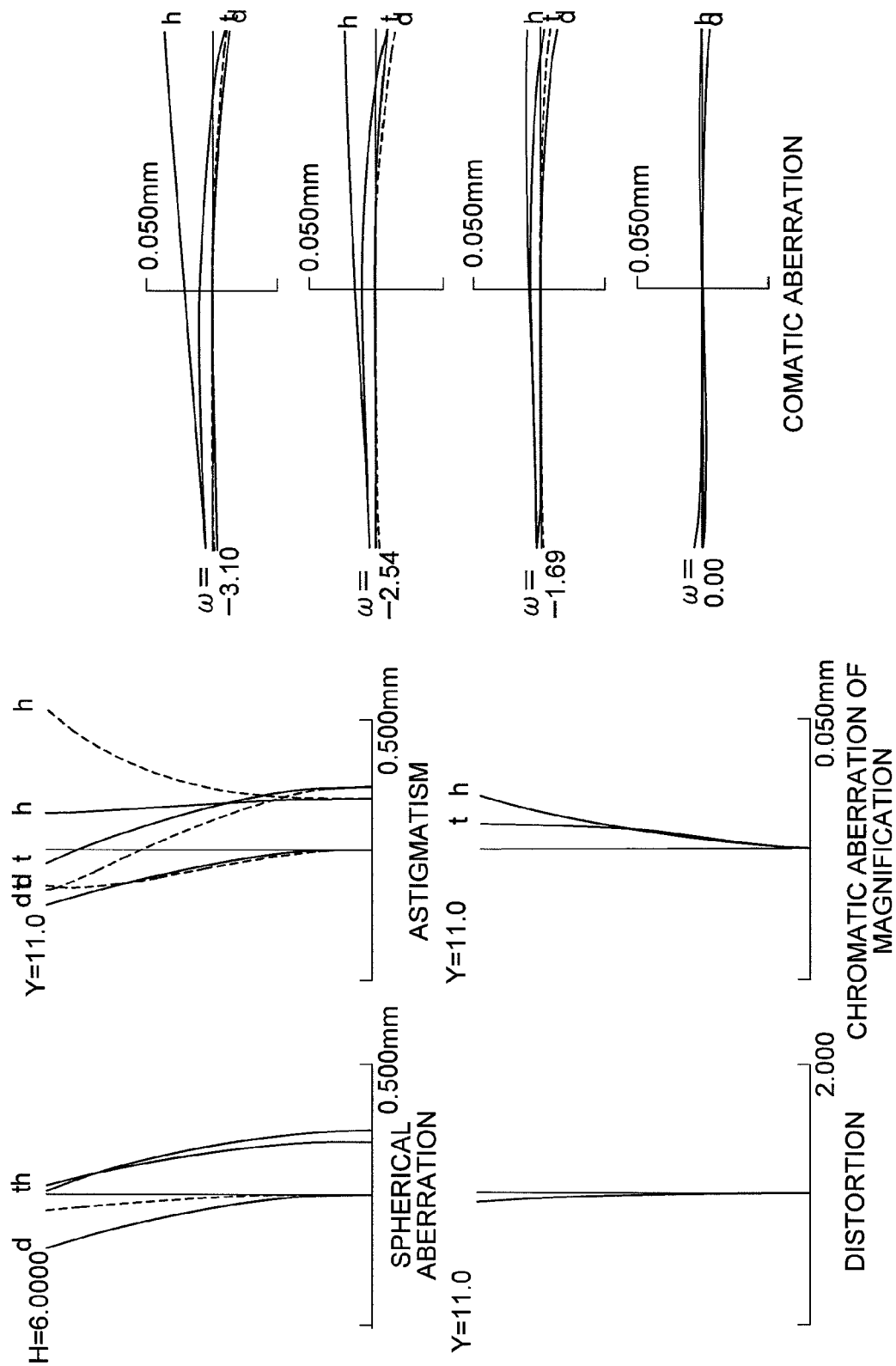
FIG. 20 is a diagram of the various aberrations on the occasion of extending the distance from the object side surface to the entrance pupil by 70 mm in Example 5.

Thus, it is understood that Example 5 satisfies the conditional expressions (1)-(3) and (7)-(9), and the transmittances of all the lenses configuring the image forming lens IL5 satisfy the conditions described above. FIG. 18 shows a diagram of the various aberrations that are the spherical aberration, the astigmatism, the distortion, the chromatic aberration of the magnification and the comatic aberration with respect to the light of the t-line, the d-line and the h-line in Example 5. As apparent from the various aberration graphs shown in FIG. 18, similarly to Example 1, the various aberrations are well corrected from the short wavelength range side to the long wavelength range side. Further, FIG. 19 shows the transmittance of the image forming lens IL5 according to Example 5, and it is recognized from FIG. 19 that the high transmittance is maintained in the wide wavelength range. Furthermore, FIG. 20 shows a diagram of the various aberrations on the occasion of extending the distance from the most object side surface (which is the second surface in FIG. 17) of the image forming lens IL5 to the exit pupil P of the objective lens by 70 mm, and it is recognized from FIG. 20 that the fluctuation of the aberration is restrained small.

What is claimed is:

1. An image forming lens for receiving parallel beams of light emitted from an observation target object and emerging from an infinity-designed objective lens of a microscope and forming an image of the observation target object in a predetermined position, comprising in order from an object side:
    a first lens group having positive refractive power; and
    a second lens group having negative refractive power,
    said first lens group comprising a positive lens and a negative lens,
    wherein when nd denotes a refractive index of glass materials of the lenses which constitute the first lens group and the second lens group with respect to d-line, nh denotes the refractive index of the glass materials with respect to h-line and nt denotes the refractive index of the glass materials with respect to t-line, and vdht and a partial dispersion ratio Pht are defined by the following conditional expressions;

$$vdht = (nd - 1)/(nh - nt)$$

$$Pht = (nh - nd)/(nd - nt)$$

the following conditional expressions are satisfied:

$$vdht1 > 24$$

$$vdht1 - vdht2 > 5$$

$$|(Pht1 - Pht2)/(vdht1 - vdht2)| < 0.015$$

where vdht1 and Pht1 respectively denote vdht and the partial dispersion ratio Pht of the glass material of said positive lens configuring said first lens group, and vdht2 and Pht2 respectively denote vdht and the partial dispersion ratio Pht of the glass material of said negative lens configuring said first lens group,
    a transmittance of each of the glass materials of all said lenses configuring said first lens group and said second lens group with respect to the light having a wavelength of 340 nm is equal to or larger than 50% per glass thickness of 10 mm, and
    the transmittance of each of the glass materials of all said lenses configuring said first lens group and said second lens group with respect to the light having the wavelength of 360 nm is equal to or larger than 80% per glass thickness of 10 mm.

2. An image forming lens according to claim 1, wherein the following conditional expression is satisfied:

$$0.7 < f1/fT < 0.9$$

where fT denotes a focal length of the image forming lens and f1 denotes a focal length of said first lens group.

3. An image forming lens according to claim 1, wherein said second lens group comprises a positive lens and a negative lens, and
    the following conditional expressions are satisfied:

$$vdht3 > 20$$

$$vdht3 - vdht4 > 2$$

$$|(Pht3 - Pht4)/(vdht3 - vdht4)| < 0.045$$

where vdht3 and Pht3 respectively denote vdht and the partial dispersion ratio Pht of the glass material of said positive lens configuring said second lens group, and vdht4 and Pht4 respectively denote vdht and the partial dispersion ratio Pht of the glass material of said negative lens configuring said second lens group.

4. An image forming lens according to claim 3, wherein the following conditional expression is satisfied:

$$-3 < f1n/f1 < -0.5$$

where f1n denotes a focal length of said positive lens configuring said first lens group and f1 denotes a focal length of said first lens group.

5. An image forming lens according to claim 4, wherein said first lens group comprises a cemented lens formed by a biconvex lens cemented with a negative meniscus lens and a cemented surface of the cemented lens has a concave surface facing the object side, and
    the following conditional expression is satisfied:

$$0.0010 < \Phi < 0.0030$$

where Φ denotes refractive power of the cemented surface.

6. An image forming lens according to claim 3, wherein said first lens group comprises a cemented lens formed by a biconvex lens cemented with a negative meniscus lens and a cemented surface of the cemented lens has a concave surface facing the object side, and the following conditional expression is satisfied:

$$0.0010 < \Phi < 0.0030$$

where $\Phi$ denotes refractive power of the cemented surface.

7. An image forming lens according to claim 1, wherein the following conditional expression is satisfied:

$$-3 < f1n/f1 < -0.5$$

where f1$n$ denotes a focal length of said positive lens configuring said first lens group and f1 denotes a focal length of said first lens group.

8. An image forming lens according to claim 7, wherein said first lens group comprises a cemented lens formed by a biconvex lens cemented with a negative meniscus lens and a cemented surface of the cemented lens has a concave surface facing the object side, and the following conditional expression is satisfied:

$$0.0010 < \Phi < 0.0030$$

where $\Phi$ denotes refractive power of the cemented surface.

9. An image forming lens according to claim 1, wherein said first lens group comprises a cemented lens formed by a biconvex lens cemented with a negative meniscus lens and a cemented surface of the cemented lens has a concave surface facing the object side, and the following conditional expression is satisfied:

$$0.0010 < \Phi < 0.0030$$

where $\Phi$ denotes refractive power of the cemented surface.

10. An image forming lens according to claim 1, wherein a most object side surface of said second lens group is convex on the object side.

11. A microscope apparatus comprising said image forming lens according to claim 1 as a second objective lens.

* * * * *